United States Patent
Hanson et al.

(10) Patent No.: US 9,691,092 B2
(45) Date of Patent: Jun. 27, 2017

(54) PREDICTING AND RESPONDING TO CUSTOMER NEEDS USING LOCAL POSITIONING TECHNOLOGY

(71) Applicant: Bank of America Corporation, Charlotte, NC (US)

(72) Inventors: Carrie Anne Hanson, Charlotte, NC (US); Sharon Scanlon, Manahawkin, NJ (US); Kim Stittsworth, Charlotte, NC (US); David M. Grigg, Rock Hill, SC (US); Davindar Gill, Palatine, IL (US)

(73) Assignee: Bank of America Corporation, Charlotte, NC (US)

( * ) Notice: Subject to any disclaimer, the term of this patent is extended or adjusted under 35 U.S.C. 154(b) by 316 days.

(21) Appl. No.: 14/327,843

(22) Filed: Jul. 10, 2014

(65) Prior Publication Data
US 2016/0012505 A1    Jan. 14, 2016

(51) Int. Cl.
*G06Q 30/06*    (2012.01)
*G06Q 20/32*    (2012.01)
*H04W 4/02*    (2009.01)

(52) U.S. Cl.
CPC ..... *G06Q 30/0613* (2013.01); *G06Q 20/3221* (2013.01); *G06Q 20/3224* (2013.01); *H04W 4/02* (2013.01)

(58) Field of Classification Search
USPC ....................................................... 235/432
See application file for complete search history.

(56) References Cited

U.S. PATENT DOCUMENTS

| | | | |
|---|---|---|---|
| 5,581,630 A | 12/1996 | Bonneau, Jr. |
| 5,991,749 A | 11/1999 | Morrill, Jr. |
| 6,513,015 B2 | 1/2003 | Ogasawara |
| 6,738,628 B1 | 5/2004 | McCall et al. |
| 6,845,361 B1 | 1/2005 | Dowling |
| 7,047,560 B2 | 5/2006 | Fishman et al. |
| 7,111,174 B2 | 9/2006 | Hamid |
| 7,149,533 B2 | 12/2006 | Laird et al. |
| 7,536,316 B2 | 5/2009 | Ozer et al. |

(Continued)

FOREIGN PATENT DOCUMENTS

KR    20090050383 A    5/2009

*Primary Examiner* — Michael G Lee
*Assistant Examiner* — David Tardif
(74) *Attorney, Agent, or Firm* — Michael A. Springs; Moore & Van Allen PLLC; Peter B. Stewart

(57) ABSTRACT

Methods and systems for predicting and responding to customer needs using local positioning technology are presented. In some embodiments, a customer assistance computing platform may receive one or more attributes associated with a beacon signal received by a customer computing device and an identifier associated with the customer computing device. Subsequently, the computing platform may determine an identity of a customer using the customer computing device. The computing platform then may determine a location of the customer using the customer computing device based on the one or more attributes associated with the beacon signal. Thereafter, the computing platform may determine one or more predicted needs of the customer. Then, the computing platform may generate a notification based on the predicted needs of the customer and may send the notification to the customer computing device.

20 Claims, 11 Drawing Sheets

(56) References Cited

U.S. PATENT DOCUMENTS

| | | |
|---|---|---|
| 7,536,722 B1 | 5/2009 | Saltz et al. |
| 7,543,738 B1 | 6/2009 | Saunders et al. |
| 7,712,657 B1 | 5/2010 | Block et al. |
| 7,774,076 B2 | 8/2010 | Skowronek |
| 7,814,016 B2 | 10/2010 | Pranger |
| 7,904,718 B2 | 3/2011 | Giobbi et al. |
| 7,911,334 B2 | 3/2011 | Busey |
| 7,912,843 B2 | 3/2011 | Murdock et al. |
| 7,979,899 B2 | 7/2011 | Guo et al. |
| 8,009,013 B1 | 8/2011 | Hirschfeld et al. |
| 8,055,551 B2 | 11/2011 | Milgramm et al. |
| 8,073,460 B1 | 12/2011 | Scofield et al. |
| 8,091,778 B1 | 1/2012 | Block et al. |
| 8,145,649 B2 | 3/2012 | Murdock et al. |
| 8,186,578 B1 | 5/2012 | Block et al. |
| 8,201,729 B1 | 6/2012 | Block et al. |
| 8,229,787 B2 | 7/2012 | Ramchandani et al. |
| 8,259,692 B2 | 9/2012 | Bajko |
| 8,260,707 B2 | 9/2012 | Treadwell et al. |
| 8,295,898 B2 | 10/2012 | Ashfield et al. |
| 8,332,232 B2 | 12/2012 | Nickerson et al. |
| 8,369,266 B2 | 2/2013 | Jin et al. |
| 8,401,897 B1 | 3/2013 | Chatterjee |
| 8,413,891 B2 | 4/2013 | Long |
| 8,467,768 B2 | 6/2013 | Mahaffey et al. |
| 8,583,933 B2 | 11/2013 | Granbery |
| 8,590,028 B2 | 11/2013 | Saxena et al. |
| 8,606,712 B2 | 12/2013 | Choudhuri et al. |
| 8,666,821 B2 | 3/2014 | Xie et al. |
| 8,671,001 B1 | 3/2014 | Thompson et al. |
| 8,742,894 B2 | 6/2014 | Seydoux |
| 9,204,257 B1 | 12/2015 | Mendelson |
| 2006/0119469 A1 | 6/2006 | Hirai et al. |
| 2007/0186258 A1 | 8/2007 | Dapper et al. |
| 2007/0186261 A1 | 8/2007 | Geile et al. |
| 2007/0192815 A1 | 8/2007 | Geile et al. |
| 2007/0195689 A1 | 8/2007 | Dapper et al. |
| 2007/0195901 A1 | 8/2007 | Geile et al. |
| 2007/0195902 A1 | 8/2007 | Geile et al. |
| 2007/0201573 A1 | 8/2007 | Geile et al. |
| 2007/0206693 A1 | 9/2007 | Geile et al. |
| 2008/0052151 A1 | 2/2008 | Xie et al. |
| 2008/0114697 A1 | 5/2008 | Black et al. |
| 2009/0252318 A1 | 10/2009 | Smith et al. |
| 2009/0259499 A1 | 10/2009 | Bhojwani et al. |
| 2009/0328052 A1 | 12/2009 | Nguyen et al. |
| 2009/0328182 A1 | 12/2009 | Malakapalli et al. |
| 2010/0017874 A1 | 1/2010 | Piccinini et al. |
| 2010/0042541 A1 | 2/2010 | Kang et al. |
| 2010/0191581 A1 | 7/2010 | Furin et al. |
| 2010/0198725 A1 | 8/2010 | Naccache |
| 2010/0277276 A1 | 11/2010 | Bayne et al. |
| 2010/0287250 A1 | 11/2010 | Carlson et al. |
| 2011/0086646 A1 | 4/2011 | Gupta et al. |
| 2011/0202377 A1 | 8/2011 | Maiya et al. |
| 2011/0208657 A1 | 8/2011 | Rao |
| 2011/0246306 A1 | 10/2011 | Blackhurst et al. |
| 2011/0313804 A1 | 12/2011 | Camp et al. |
| 2011/0321031 A1 | 12/2011 | Dournov et al. |
| 2012/0004769 A1 | 1/2012 | Hallenbeck et al. |
| 2012/0047072 A1 | 2/2012 | Larkin |
| 2012/0070041 A1 | 3/2012 | Wang |
| 2012/0076183 A1 | 3/2012 | Dapper et al. |
| 2012/0078673 A1 | 3/2012 | Koke et al. |
| 2012/0078741 A1 | 3/2012 | DeLine |
| 2012/0116929 A1 | 5/2012 | Gventer et al. |
| 2012/0130840 A1 | 5/2012 | Carlier et al. |
| 2012/0136479 A1 | 5/2012 | Signorelli et al. |
| 2012/0143755 A1 | 6/2012 | Burrell |
| 2012/0158297 A1 | 6/2012 | Kim et al. |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0030915 A1 | 1/2013 | Statler et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0203383 A1 | 8/2013 | Stopel et al. |
| 2013/0211718 A1 | 8/2013 | Yoo et al. |
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0275163 A1 | 10/2013 | Kaiser |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0346189 A1* | 12/2013 | Isaacs ............... G06Q 30/0255 705/14.45 |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0105263 A1 | 4/2014 | Geile |
| 2014/0110481 A1 | 4/2014 | Burnside et al. |
| 2014/0114877 A1 | 4/2014 | Montano |
| 2014/0201025 A1 | 7/2014 | Adoni et al. |
| 2014/0222603 A1 | 8/2014 | Hay |
| 2014/0258028 A1* | 9/2014 | Bynum ............... G01C 21/3484 705/26.8 |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279450 A1 | 9/2014 | Gujral |
| 2014/0297527 A1 | 10/2014 | McLaughlin et al. |
| 2014/0309770 A1 | 10/2014 | Signorelli et al. |
| 2015/0059002 A1* | 2/2015 | Balram ............... G06F 3/011 726/28 |
| 2015/0089585 A1 | 3/2015 | Novack |

* cited by examiner

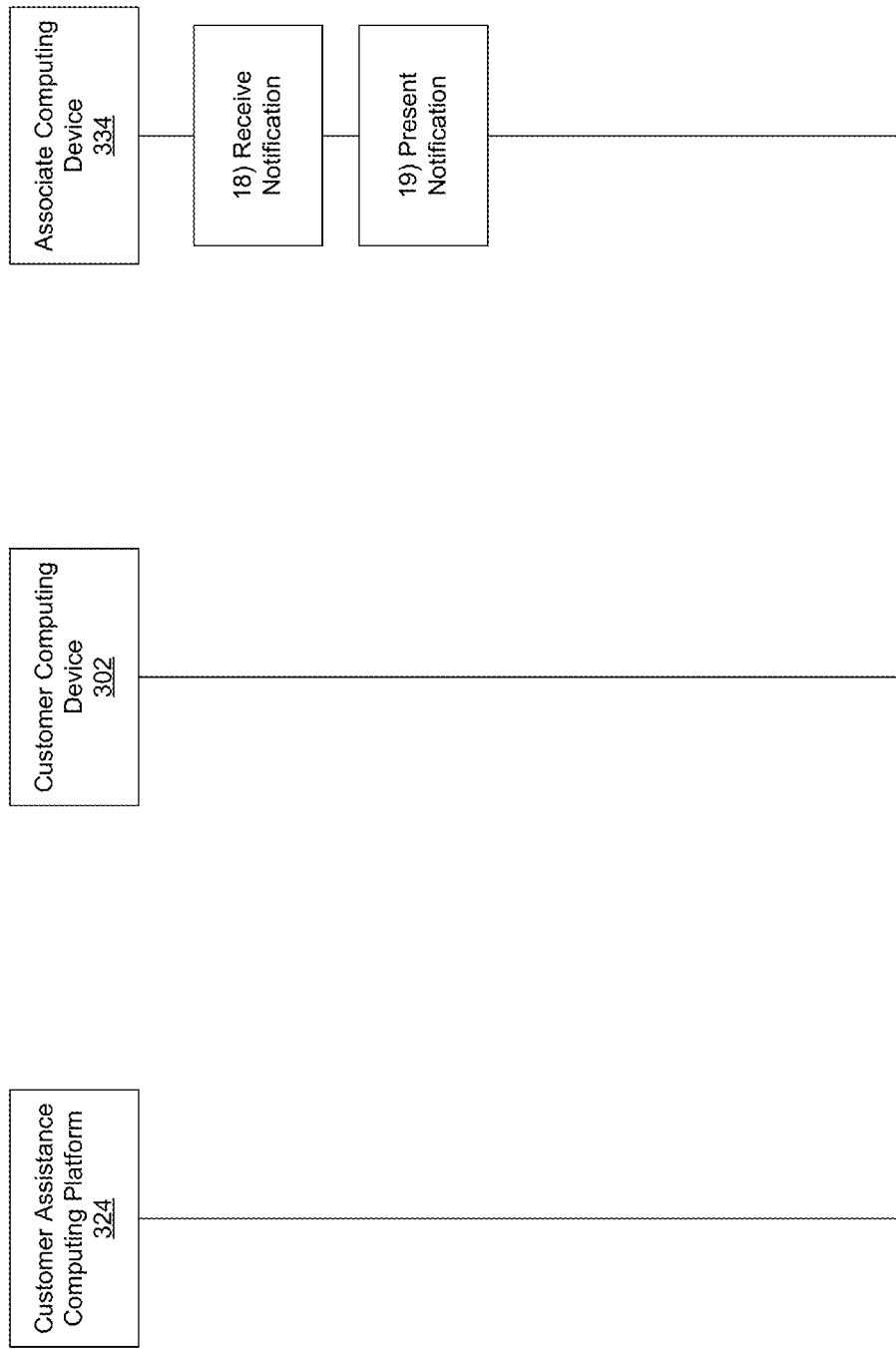

PREDICTING AND RESPONDING TO CUSTOMER NEEDS USING LOCAL POSITIONING TECHNOLOGY

BACKGROUND

Aspects of the disclosure relate to computer hardware and software. In particular, one or more aspects of the disclosure generally relate to computer hardware and software for predicting and responding to customer needs using local positioning technology.

Many people are increasingly using mobile devices, such as smart phones, tablet computers, wearable devices (e.g., augmented reality glasses, smart watches, and the like), and other types of personal computing devices and mobile computing devices, for a variety of different purposes. As these devices grow more and more popular, users of such devices increasingly demand greater functionality and convenience from such devices, and various organizations and other business entities in turn may be presented with new opportunities to engage and interact with customers and potential customers via such devices.

Although it may be possible for an organization to provide all sorts of information to its customers and potential customers via their mobile devices, it may still remain difficult to engage and interact with customers and potential customers via such devices at the right time, in the right place, with the right information, and/or in an otherwise contextually-relevant way.

SUMMARY

Aspects of the disclosure relate to various systems and techniques that provide effective, efficient, scalable, and convenient ways of engaging customers and potential customers in contextually-relevant ways, particularly in ways that involve predicting and responding to customer needs using local positioning technology, such as indoor positioning technology.

In accordance with one or more embodiments, a customer assistance computing platform that includes at least one processor, memory, and a communication interface may receive, via the communication interface, from a customer computing device, one or more attributes associated with a beacon signal received by the customer computing device and an identifier associated with the customer computing device. Subsequently, the customer assistance computing platform may determine an identity of a customer using the customer computing device based on the identifier associated with the customer computing device. The customer assistance computing platform then may determine a location of the customer using the customer computing device based on the one or more attributes associated with the beacon signal received by the customer computing device. Thereafter, the customer assistance computing platform may determine one or more predicted needs of the customer using the customer computing device based on the identity of the customer using the customer computing device and based on the location of the customer using the customer computing device. Then, the customer assistance computing platform may generate, based on the one or more predicted needs of the customer using the customer computing device, a notification. Subsequently, the customer assistance computing platform may send, via the communication interface, to the customer computing device, the notification.

In some embodiments, the beacon signal received by the customer computing device may be associated with at least one beacon deployed at a banking center. In addition, the one or more attributes associated with the beacon signal received by the customer computing device may, in some instances, include a unique identifier associated with the at least one beacon deployed at the banking center.

In some embodiments, the identifier associated with the customer computing device may include user account information associated with a mobile banking application on the customer computing device. In some instances, the customer assistance computing platform may receive, via the communication interface, from the customer computing device, biometric input information captured by the mobile banking application on the customer computing device. In addition, determining the identity of the customer using the customer computing device may, in some instances, include confirming the identity of the customer using the customer computing device based on the biometric input information captured by the mobile banking application on the customer computing device.

In some embodiments, determining the location of the customer using the customer computing device may include accessing beacon deployment information that maps identifiers for a plurality of beacons to corresponding deployment locations of the plurality of beacons. In some instances, determining the location of the customer using the customer computing device may include determining that the customer using the customer computing device is located in a specific area of the banking center.

In some embodiments, the one or more predicted needs of the customer using the customer computing device may be determined based on online account activity information. Additionally or alternatively, the one or more predicted needs of the customer using the customer computing device may be determined based on transaction history information. Additionally or alternatively, the one or more predicted needs of the customer using the customer computing device may be determined based on customer demographic information.

In some embodiments, the notification may be configured to prompt the customer using the customer computing device to identify one or more actual needs. Additionally or alternatively, the notification may be configured to instruct the customer using the customer computing device to proceed to a specific area at the banking center. Additionally or alternatively, the notification may be configured to prompt the customer using the customer computing device to make an appointment at a location different from the banking center.

In some embodiments, the customer assistance computing platform may receive, via the communication interface, from the customer computing device, needs input information. Subsequently, the customer assistance computing platform may update the one or more predicted needs of the customer using the customer computing device based on the needs input information.

In some embodiments, the customer assistance computing platform may generate a notification configured to advise at least one banking center associate of the one or more predicted needs of the customer using the customer computing device. Subsequently, the customer assistance computing platform may send, via the communication interface, to an associate computing device, the notification.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4E depict an illustrative event sequence for predicting and responding to customer needs using local positioning technology in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
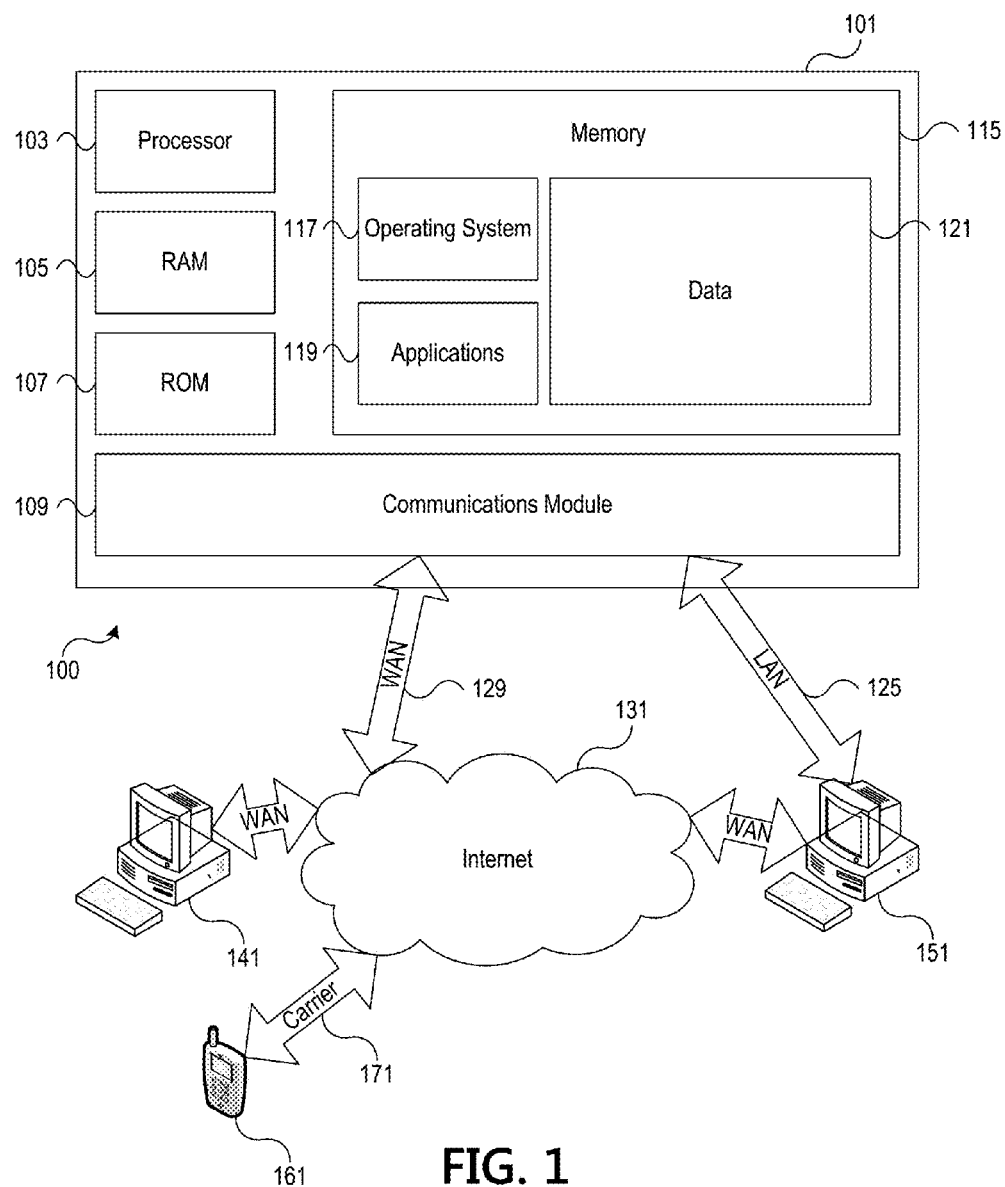
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
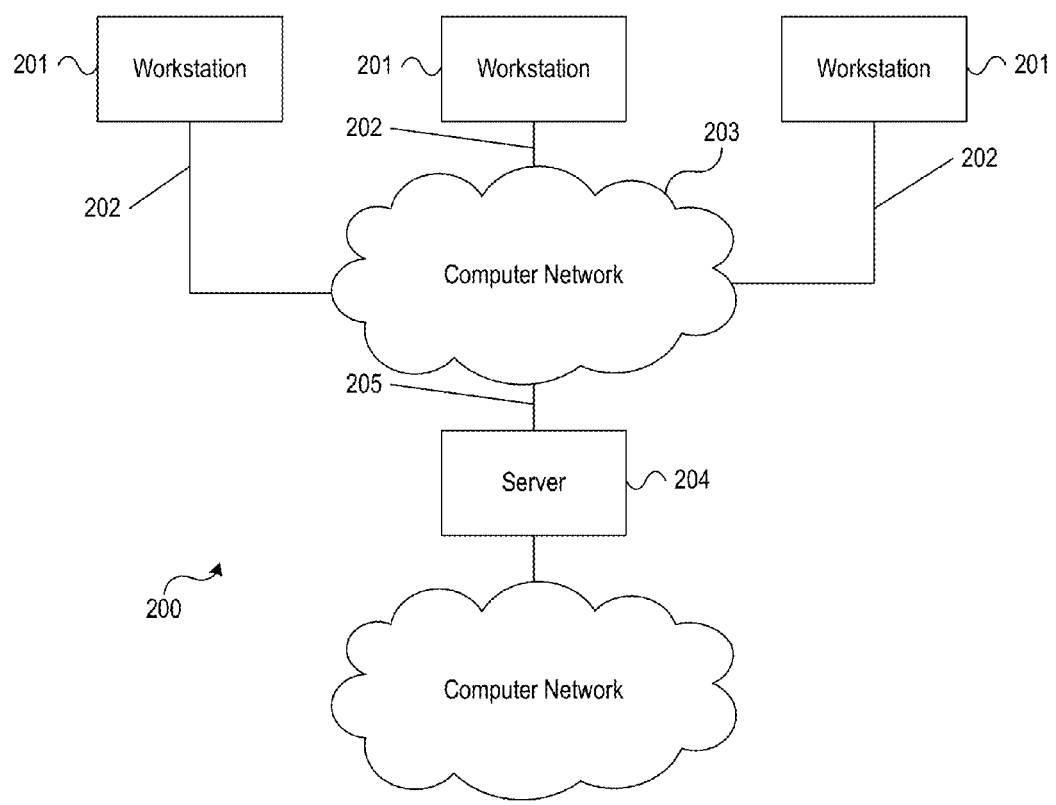
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
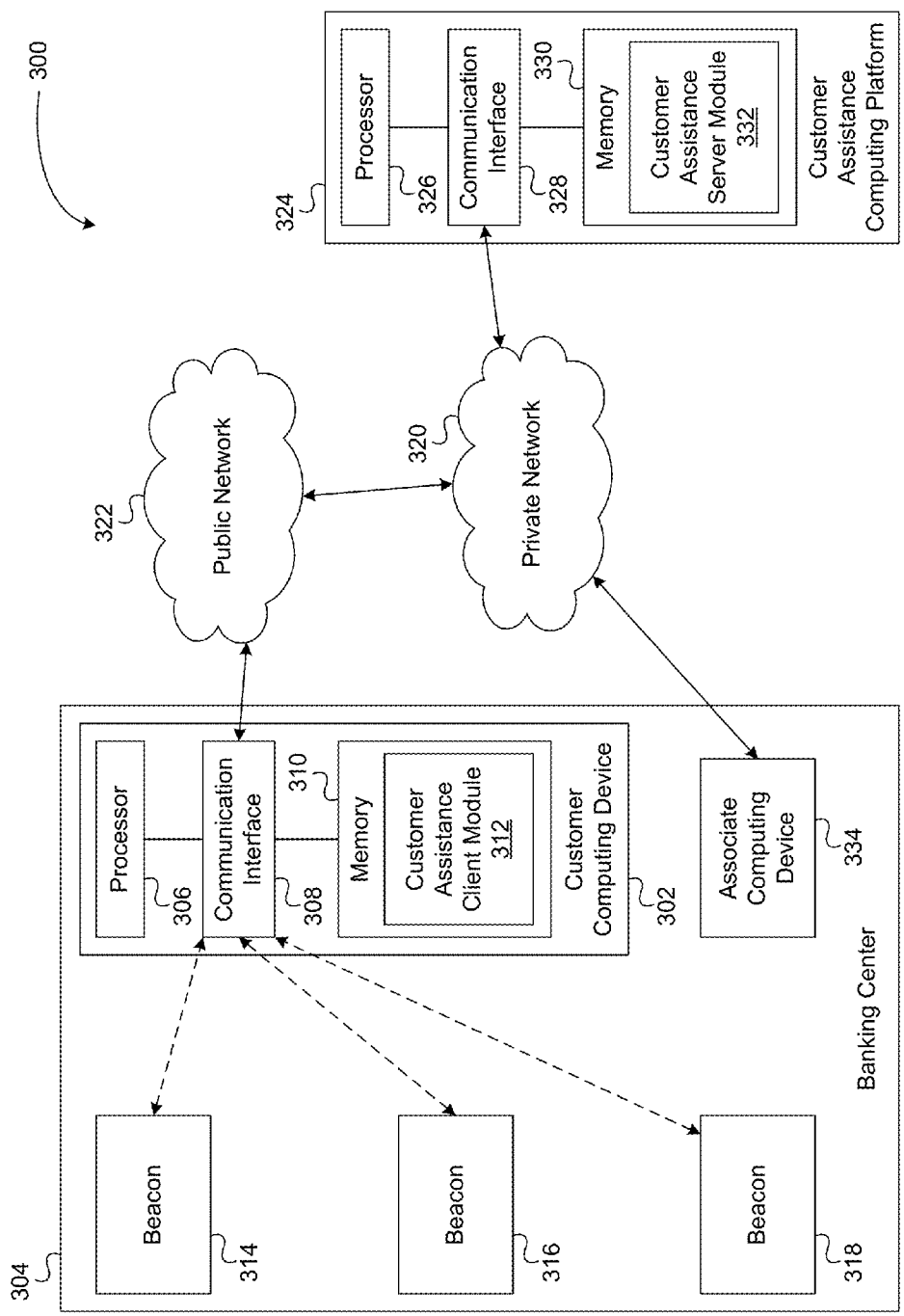
FIG. 3 depicts an illustrative computing environment for predicting and responding to customer needs using local positioning technology in accordance with one or more example embodiments.

FIG. 3 depicts an illustrative computing environment for predicting and responding to customer needs using local positioning technology in accordance with one or more example embodiments. Referring to FIG. 3, computing environment 300 may include one or more computing devices, such as customer computing device 302. Customer computing device 302 may be any type of computing device capable of receiving a user interface, receiving input via the user interface, and communicating the received input to one or more other computing devices. For example, customer computing device 302 may be a desktop computer, laptop computer, tablet computer, smart phone, or the like. In one or more arrangements, customer computing device 302 may be a personal computing device, such as a mobile computing device (e.g., a smart phone, a tablet computer, a wearable computer, augmented reality glasses, or any other type of mobile device), that belongs to and/or is used by a customer of a financial institution at and/or near a banking center 304 and/or any other location operated by, controlled by, and/or otherwise associated with the financial institution.

Computing environment 300 also may include one or more location beacons, such as location beacon 314, location beacon 316, and location beacon 318. Each location beacon (e.g., location beacon 314, location beacon 316, and location beacon 318) may be configured to transmit one or more radio signals that may be detected and/or received by other devices located in close proximity of and/or otherwise within a predetermined distance of the particular location beacon. In one or more embodiments, any and/or all of the location beacons included in computing environment 300 (e.g., location beacon 314, location beacon 316, and location beacon 318) may implement Bluetooth Low Energy (also referred to as "Bluetooth LE," "Bluetooth Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it located at and/or near the specific location where the location beacon is positioned.

For example, in one or more arrangements discussed below, the one or more location beacons (e.g., location beacon 314, location beacon 316, and location beacon 318) may be positioned at and/or near banking center 304, and may be specifically positioned at and/or near different areas of banking center 304, such as at a welcome area, at a teller counter or window, at a waiting area, at an external alcove where an automated teller machine (ATM) is located, at an external window where drive-up services are provided, at a parking lot, and/or in one or more other distinct areas of banking center 304. In addition, each location beacon may transmit a radio signal that may be detected and/or received by other devices at banking center 304, such as customer computing device 302, which may enable such devices to determine that they are present at banking center 304 and/or located at and/or near a particular area of banking center 304.

In one or more embodiments, customer computing device 302 may include at least one processor 306, communication interface 308, and/or memory 310. A data bus may interconnect processor 306, communication interface 308, and/or memory 310. Memory 310 may include one or more program modules comprising instructions that when executed by processor 306 cause customer computing device 302 to perform one or more functions described herein. For example, memory 310 may include customer assistance client module 312, which may include instructions that when executed by processor 306 cause customer computing device 302 to perform one or more functions described herein. Communication interface 308 may include one or more wired and/or wireless communication interfaces (e.g., network interfaces, radio interfaces, or the like) that are configured to support communication between customer computing device 302 and one or more other devices and/or networks. In one or more arrangements, communication interface 308 may include at least one network interface that facilitates communication between customer computing device 302 and one or more devices and/or networks that are located remotely from banking center 304, and communication interface 308 may further include at least one radio interface that facilitates communication between and/or enables customer computing device 302 to receive wireless radio signals from one or more location beacons (e.g., location beacon 314, location beacon 316, and location beacon 318) and/or other radio transmitters that may be located at and/or near banking center 304.

Computing environment 300 also may include one or more computing platforms. For example, computing environment 300 may include customer assistance computing platform 324. Customer assistance computing platform 324 may include one or more computing devices configured to perform one or more of the functions described herein. For example, customer assistance computing platform 324 may include one or more computers (e.g., laptop computers, desktop computers, servers, server blades, or the like).

Computing environment 300 also may include one or more networks, which may interconnect customer computing device 302, customer assistance computing platform 324, and/or one or more other computing devices. For example, computing environment 300 may include private network 320 and public network 322. Private network 320 and/or public network 322 may include one or more sub-networks (e.g., LANs, WANs, or the like). Private network 320 may be associated with a particular organization (e.g., a corporation, financial institution, educational institution, governmental institution, or the like) and may interconnect one or more computing devices associated with the organization. For example, customer assistance computing platform 324 may be associated with an organization, such as the financial institution that operates, controls, and/or is otherwise associated with banking center 304, and private network 320 may be operated by and/or otherwise associated with the organization, and may include one or more networks (e.g., LANs, WANs, VPNs, or the like) that interconnect customer assistance computing platform 324 and one or more other computing devices associated with the organization. Public network 322 may connect private network 320 and/or one or more computing devices connected thereto (e.g., customer assistance computing platform 324) with one or more networks and/or computing devices that are not associated with the organization. For example, customer computing device 302 might not be associated with the organization that operates and/or is associated with private network 320, and public network 322 may include one or more networks (e.g., the Internet) that connect customer computing device 302 to private network 320 and/or one or more computing devices connected thereto (e.g., customer assistance computing platform 324).

Customer assistance computing platform 324 may include at least one processor 326, communication interface 328, and/or memory 330. Memory 330 may include one or more program modules comprising instructions that when executed by processor 326 cause customer assistance computing platform 324 to perform one or more functions described herein. For example, memory 330 may include customer assistance server module 332, which may include instructions that when executed by processor 326 cause customer assistance computing platform 324 to perform one or more functions described herein. Communication interface 328 may include one or more wired and/or wireless communication interfaces (e.g., network interfaces, radio interfaces, or the like) that are configured to support communication between customer assistance computing platform 324 and one or more other devices and/or networks. For example, communication interface 328 may include at least one network interface that facilitates communication between customer assistance computing platform 324 and one or more other devices and/or networks (e.g., private network 320, public network 322, customer computing device 302, and/or other devices and networks).

Computing environment 300 also may include a banking center associate computing device 334. Banking center associate computing device 334 may include one or more processors, memories, and/or communication interfaces, similar to those that may be included in customer computing device 302. In some instances, banking center associate computing device 334 may be used by an associate, employee, or agent of an organization that may operate the banking center 304, such as the financial institution that may operate the banking center 304, and/or may be used by any other individual associated with such the organization. Banking center associate computing device 334 may be configured to connect to private network 320 and/or may communicate with customer assistance computing platform 324 via private network 320 and one or more communication interfaces. Additionally or alternatively, banking center associate computing device 334 may be configured to connect to public network 322 and/or may communicate with one or more computing devices via public network 322 and one or more communication interfaces. In some instances, multiple banking center associate computing devices, each being similar to banking center associate computing device 334, may be present at a particular banking center, such as banking center 304, even though only one such banking center associate computing device is illustrated in the example depicted in FIG. 3. Similarly, multiple customer computing devices, each being similar to customer computing device 302, may be present at a particular banking center, such as banking center 304, even though only one such customer computing device is illustrated in the example depicted in FIG. 3. Additionally or alternatively, a particular banking center, such as banking center 304, may have any number of beacons, each being similar to beacons 314, 316, and 318, even though three such beacons are illustrated in the example depicted in FIG. 3.

Figure 4A:
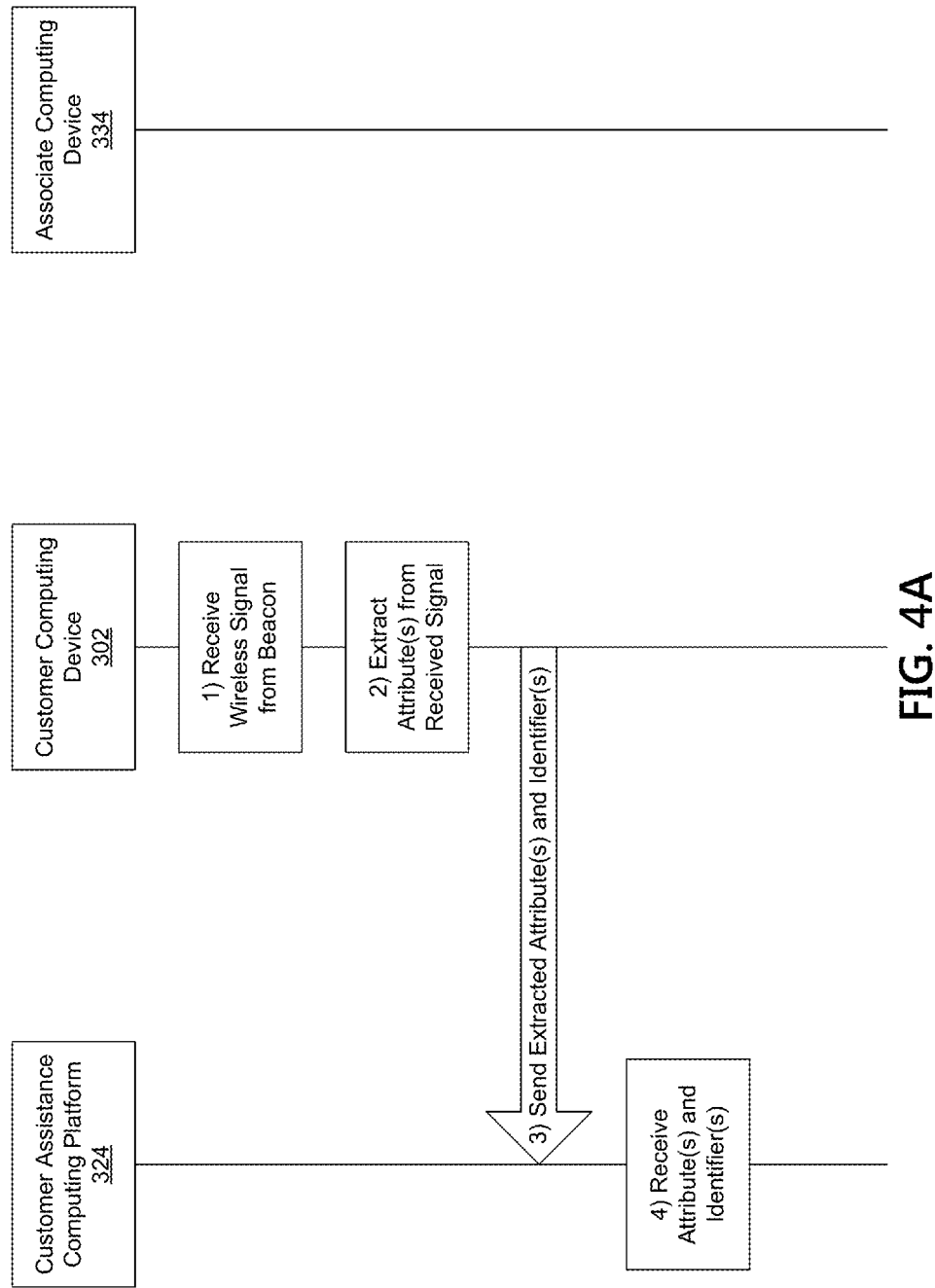
Figure 4B:
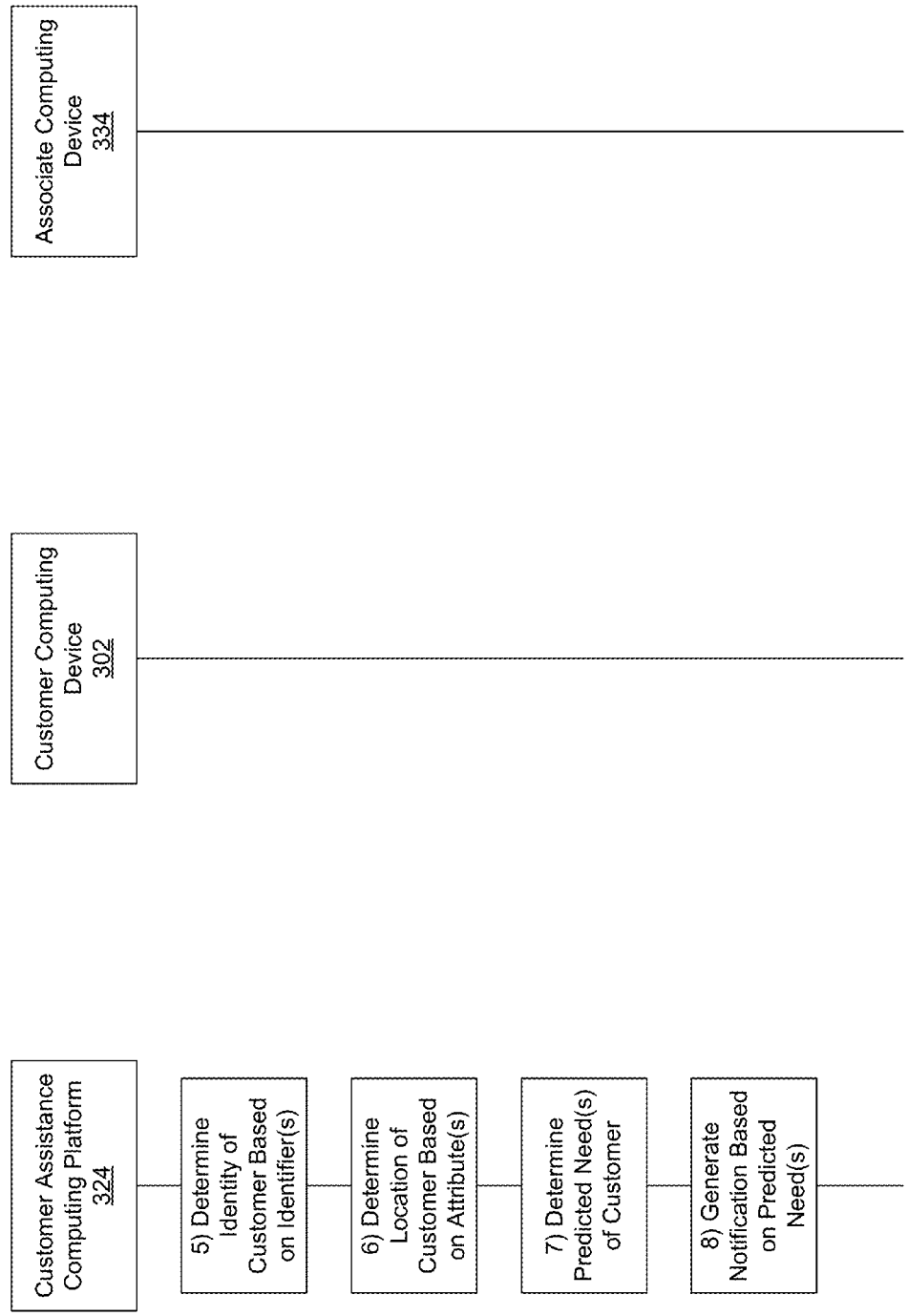

FIG. 4A-4E depict an illustrative event sequence for predicting and responding to customer needs using local positioning technology in accordance with one or more example embodiments. Referring to FIG. 4A, at step 1, customer computing device 302 may receive a wireless signal from a location beacon. For example, customer computing device 302 may receive such a wireless signal from one or more of beacon 314, beacon 316, and/or beacon 318. Such a wireless signal, which also may be referred to as a "beacon signal," may be received when (and/or just before and/or after) a user of customer computing device 302 arrives at, enters, and/or otherwise visits banking center 304 (or any other location where the location beacon(s) may be deployed). Thus, the beacon signal received by the customer computing device may, in some instances, be associated with at least one beacon deployed at a banking center, such as banking center 304.

At step 2, customer computing device 302 may extract one or more attributes from the wireless signal received from the location beacon. For example, in extracting one or more attributes from the beacon signal, customer computing device 302 may identify and/or otherwise determine a unique identifier assigned to and/or otherwise associated with the particular location beacon from which the beacon signal was received. If, for instance, a location beacon is deployed at a banking center, such as banking center 304, the one or more attributes associated with the beacon signal received by the customer computing device may include a unique identifier associated with the location beacon deployed at the banking center. Additionally or alternatively, in extracting one or more attributes from the beacon signal, customer computing device 302 may identify and/or otherwise determine one or more other attributes associated with the beacon signal, such as a frequency of the beacon signal, an amplitude of the beacon signal, a round trip time (RTT) value and/or a round trip delay (RTD) value for the beacon signal, an estimated range to the location beacon transmitting the beacon signal, and/or the like.

At step 3, customer computing device 302 may send, to customer assistance computing platform 324, the one or more attributes associated with the beacon signal and/or one or more identifiers associated with customer computing device 302. For example, customer computing device 302 may send, to customer assistance computing platform 324, any and/or all of the attributes extracted from the beacon signal. Additionally or alternatively, customer computing device 302 may send, to customer assistance computing platform 324, information that includes one or more identifiers that are assigned to customer computing device 302, one or more software applications running on customer computing device 302, one or more users of and/or user accounts associated with customer computing device 302, and/or one or more other identifiers that are otherwise associated with customer computing device 302. For instance, customer computing device 302 may send, to customer assistance computing platform 324, an identifier and/or other data that is linked to, and can be used by customer assistance computing platform 324 to identify, customer computing device 302. Additionally or alternatively, customer computing device 302 may send, to customer assistance computing platform 324, an identifier and/or other data that is linked to, and can be used by customer assistance computing platform 324 to identify, a user of customer computing device 302 (e.g., login information entered by the user of customer computing device 302 to access and/or use one or more functions provided by customer computing device 302, a username associated with the user of customer computing device 302 and used in accessing a mobile banking application and/or a mobile banking website on customer computing device 302, and/or other information).

At step 4, customer assistance computing platform 324 may receive the one or more attributes and/or the one or more identifiers from customer computing device 302. For example, customer assistance computing platform 324 may receive, via communication interface 328, from customer computing device 302, the one or more attributes associated with the beacon signal received by customer computing device 302 and one or more identifiers associated with customer computing device 302. In some embodiments, the one or more identifiers associated with the customer computing device may include user account information associated with a mobile banking application on the customer computing device. For example, at least one identifier of the one or more identifiers that may be received by customer assistance computing platform 324 from customer computing device 302 at step 4 may include user account information associated with a mobile banking application installed on, running on, and/or otherwise associated with customer computing device 302. Such user account information may, for example, include a username, password, account number, and/or other user-specific information that may be used in accessing various functions of the mobile banking application and/or a mobile banking website (which may, e.g., be provided by the financial institution operating banking center 304).

In some instances, in addition to receiving one or more attributes associated with a beacon signal and at least one identifier from customer computing device 302, customer assistance computing platform 324 also may receive biometric input information from customer computing device 302. Such biometric input information may, for instance, be captured by a mobile banking application installed on, running on, and/or otherwise associated with customer computing device 302. For example, at and/or after step 4, customer assistance computing platform 324 may receive, via communication interface 328, from customer computing device 302, biometric input information captured by a mobile banking application on the customer computing device. The biometric input information received by customer assistance computing platform 324 from customer computing device 302 may, for example, include information associated with one or more fingerprints, retina scans, voiceprints, facial images, and/or other biometrics associated with the user of customer computing device 302.

At step 5, customer assistance computing platform 324 may determine the identity of a customer based on the one or more identifiers received from customer computing device 302. For example, customer assistance computing platform 324 may determine an identity of a customer using customer computing device 302 based on the identifier associated with the customer computing device (which may, e.g., have been received at step 4). In instances in which customer computing device 302 also sent, and customer assistance computing platform 324 received, biometric input information, customer assistance computing platform 324 may use the received biometric input information in identifying and/or authenticating the customer using customer computing device 302. For example, in determining the identity of the customer using customer computing device 302 in such instances, customer assistance computing platform 324 may confirm the identity of the customer using customer computing device 302 based on the biometric input information (which may, e.g., have been captured by the mobile banking application on the customer computing device).

At step 6, customer assistance computing platform 324 may determine the location of the customer based on the one or more attributes received from customer computing device 302. For example, customer assistance computing platform 324 may determine a location of the customer using customer computing device 302 based on the one or more attributes associated with the beacon signal received by customer computing device 302. In one or more embodiments, the location of the customer using the customer computing device may be determined based on information identifying the known deployment location of the location beacon from which the customer computing device received the beacon signal. In some embodiments, determining the location of the customer using the customer computing device may thus include accessing beacon deployment information that maps identifiers for a plurality of location beacons to corresponding deployment locations of the plurality of location beacons. The deployment locations of the plurality of location beacons (which may, e.g., be mapped in the beacon deployment information) may, for example, include two or more different banking centers that are operated by the financial institution, specific areas of various banking centers operated by the financial institution, and/or other areas associated with the financial institution.

In some embodiments, determining the location of the customer using the customer computing device may include determining that the customer using the customer computing device is located in a specific area of a banking center, such as banking center 304. For example, in addition to determining that the customer using customer computing device 302 is located at and/or near a particular banking center, such as banking center 304, customer assistance computing platform 324 may determine that the customer using customer computing device 302 is located in a particular area of the banking center, such as in the main lobby of the banking center, in a teller line, in a waiting area, in or outside of a particular office, in an automated teller machine (ATM) vestibule, in a parking lot outside of the banking center, at an external ATM outside of the banking center, in a particular drive-up service lane outside of the banking center, and/or the like.

At step 7, customer assistance computing platform 324 may determine one or more predicted needs of the customer using customer computing device 302. For example, at step 7, customer assistance computing platform 324 may determine one or more predicted needs of the customer using customer computing device 302 based on the identity of the customer using customer computing device 302 (e.g., as determined at step 5) and/or based on the location of the customer using customer computing device 302 (e.g., as determined at step 6). In some instances, in determining one or more predicted needs of the customer, customer assistance computing platform 324 may itself predict the customer's needs based on various sources of information that may be maintained by and/or accessible to customer assistance computing platform 324. In other instances, customer assistance computing platform 324 may provide the identity of the customer and/or the location of the customer to one or more other computer systems that may, for instance, predict the customer's needs and return information identifying the customer's predicted needs to customer assistance computing platform 324. In this and/or other ways, customer assistance computing platform 324 may, for example, integrate with other computer systems that are operated and/or used by the financial institution operating the banking center (e.g., banking center 304). In some instances, in determining one or more predicted needs of the customer, customer assistance computing platform 324 may determine several predicted needs of the customer, and as illustrated below, the customer may be presented with multiple options with respect to their predicted needs and/or may be prompted to select one or more reasons for visiting the banking center (e.g., banking center 304).

In some embodiments, the one or more predicted needs of the customer using the customer computing device may be determined based on online account activity information. For example, customer assistance computing platform 324 may determine the one or more predicted needs of the customer using customer computing device 302 based on online account activity information that is specific to and/or otherwise associated with the customer using customer computing device 302. Such online account activity information may, for example, include information describing the customer's previous interaction(s) with an online banking website, a mobile banking interface, web browsing and/or search history, and/or other information. For example, online account activity information may indicate that the customer has started a loan application on an online banking website, and it may be predicted (e.g., by customer assistance computing platform 324) that the customer is visiting the banking center (e.g., banking center 304) to meet with an associate to discuss the loan application. As another example, online account activity information may indicate that the customer has searched for and/or viewed information about product upgrades and/or opening new accounts and/or otherwise researched various products via an online banking website, and any and/or all of this information may be used in predicting the needs of the customer.

In some embodiments, the one or more predicted needs of the customer using the customer computing device may be determined based on transaction history information. For example, customer assistance computing platform 324 may determine the one or more predicted needs of the customer using customer computing device 302 based on transaction history information that is specific to and/or otherwise associated with the customer using customer computing device 302. Such transaction history information may, for example, include information describing one or more transactions that the customer has completed using his or her checking account, savings account, and/or other accounts that the customer may maintain with the financial institution operating the banking center (e.g., banking center 304). For example, transaction history information may indicate that one of the customer's accounts has a negative balance, and it may be predicted (e.g., by customer assistance computing platform 324) that the customer is visiting the banking center (e.g., banking center 304) to resolve this situation. As another example, transaction history information may indicate that one of the customer's certificate of deposit accounts will mature soon, and it may be predicted (e.g., by customer assistance computing platform 324) that the customer is visiting the banking center (e.g., banking center 304) to meet with an associate to discuss this account.

In some embodiments, the one or more predicted needs of the customer using the customer computing device may be determined based on customer demographic information. For example, customer assistance computing platform 324 may determine the one or more predicted needs of the customer using customer computing device 302 based on customer demographic information that is specific to and/or otherwise associated with the customer using customer computing device 302. Such customer demographic information may, for example, include information about the customer's age, gender, region, and/or other demographic information (which may, e.g., be maintained by customer assistance computing platform 324 and/or accessible to customer assistance computing platform 324 via one or more other computer systems operated by and/or otherwise associated the financial institution operating the banking center).

At step 8, customer assistance computing platform 324 may generate a notification. For example, at step 8, customer assistance computing platform 324 may generate, based on the one or more predicted needs of the customer using customer computing device 302, a notification. In some instances, the notification may be configured to prompt the customer using customer computing device 302 to identify one or more actual needs. For example, customer assistance computing platform 324 may generate a notification that is configured to prompt the customer using customer computing device 302 to enter and/or otherwise identify one or more reasons for which they are visiting the banking center (e.g., banking center 304). In some instances, the notification may be configured to instruct the customer using customer computing device 302 to proceed to a specific area at the banking center. For example, customer assistance computing platform 324 may generate a notification that is configured to instruct the customer using customer computing device 302 to walk towards and/or otherwise proceed to a different area of banking center 304 than the area where the customer may be currently located (e.g., based on the location of the customer determined at step 6 above). In some instances, the notification may be configured to prompt the customer using customer computing device 302 to make an appointment at a location different from the banking center. For example, customer assistance computing platform 324 may generate a notification that is configured to allow the customer using customer computing device 302 to make an appointment at a different banking center that can better address the customer's predicted and/or actual needs. Such a different banking center may, for instance, be located at a different location than, but within a predetermined distance of, banking center 304, which the customer using customer computing device 302 may be currently visiting.

Figure 6:
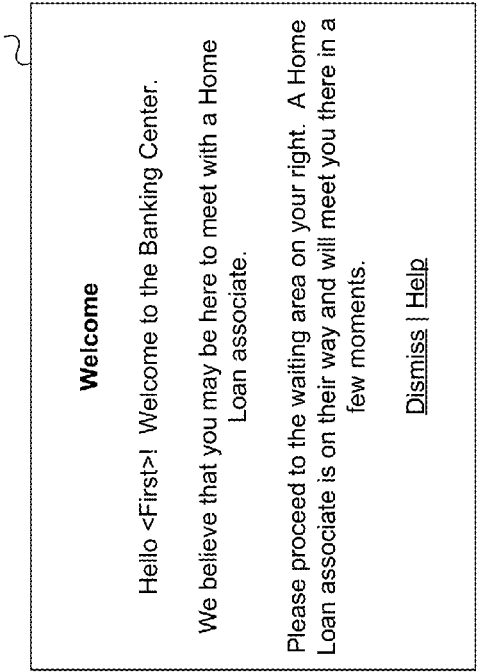
FIGS. 5-8 depict example graphical user interfaces for predicting and responding to customer needs using local positioning technology in accordance with one or more example embodiments.
Figure 5:
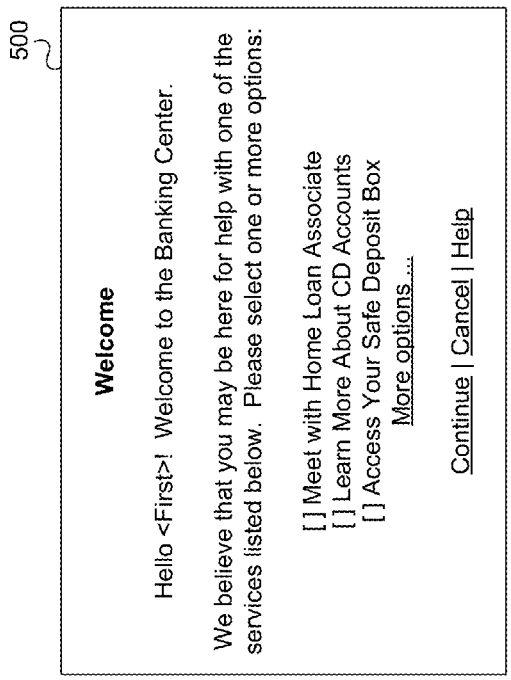
Figure 7:
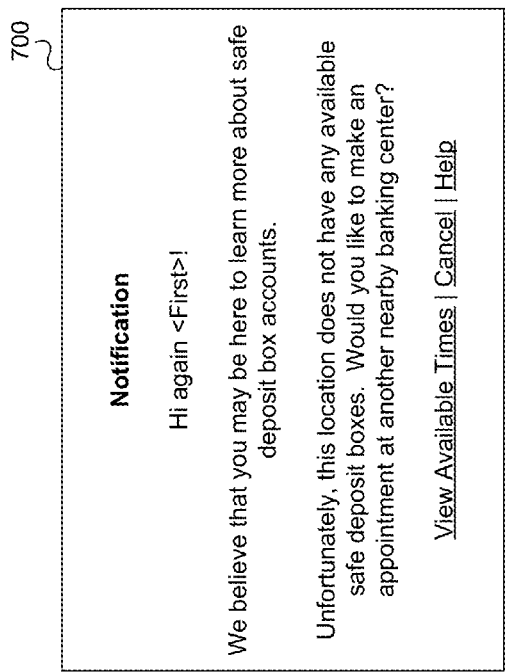

At step 9, customer assistance computing platform 324 may send the generated notification to customer computing device 302. For example, at step 9, customer assistance computing platform 324 may send, via communication interface 328, to customer computing device 302, the notification (e.g., as generated at step 8). At step 10, customer computing device 302 may receive the notification from customer assistance computing platform 324. At step 11, customer computing device 302 may present the notification received from customer assistance computing platform 324. In presenting such a notification, customer computing device 302 may, for example, display, cause to be displayed, and/or otherwise present a graphical user interface similar to graphical user interface 500, as seen in FIG. 5, and/or graphical user interface 600, as seen in FIG. 6, and/or graphical user interface 700, as seen in FIG. 7. In the example illustrated in FIG. 5, the user of customer computing device 302 may be presented with one or more predicted needs and/or may be prompted to select and/or otherwise identify one or more actual needs and/or reasons for visiting the banking center (e.g., banking center 304). In the example illustrated in FIG. 6, the user of customer computing device 302 may be presented with one or more predicted needs and/or may be instructed to proceed to a specific area of the banking center (which may, e.g., be a different area of the banking center than the area in which the customer is currently located, for instance, because the customer has visited an incorrect area of the banking center). In the example illustrated in FIG. 7, the user of customer computing device 302 may be presented with one or more predicted needs and/or may be prompted and/or otherwise provided with an option to make an appointment at another banking center or other location (e.g., because the customer may have visited a banking center that cannot serve the customer's predicted and/or actual needs).

Figure 4C:
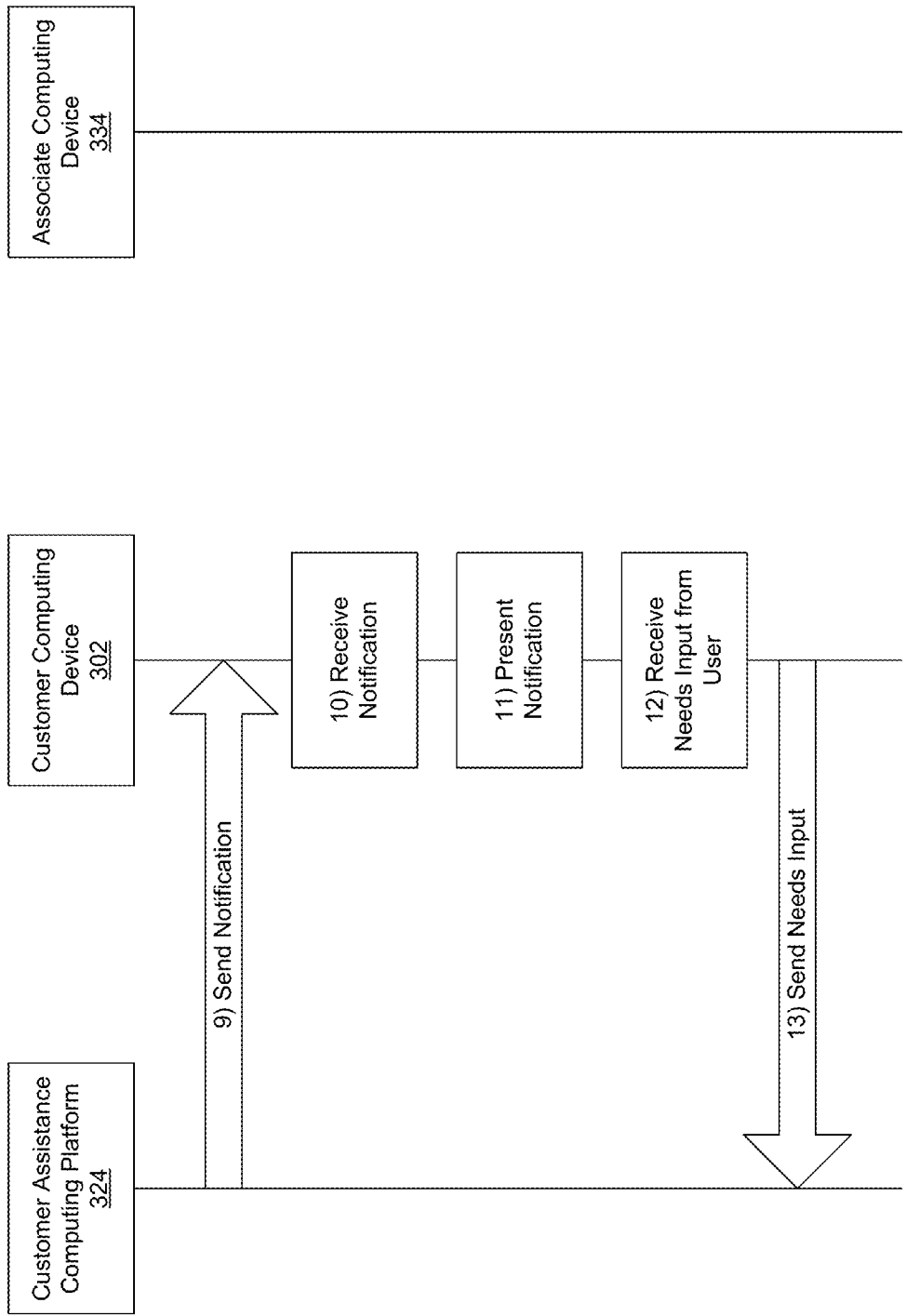
Figure 4D:
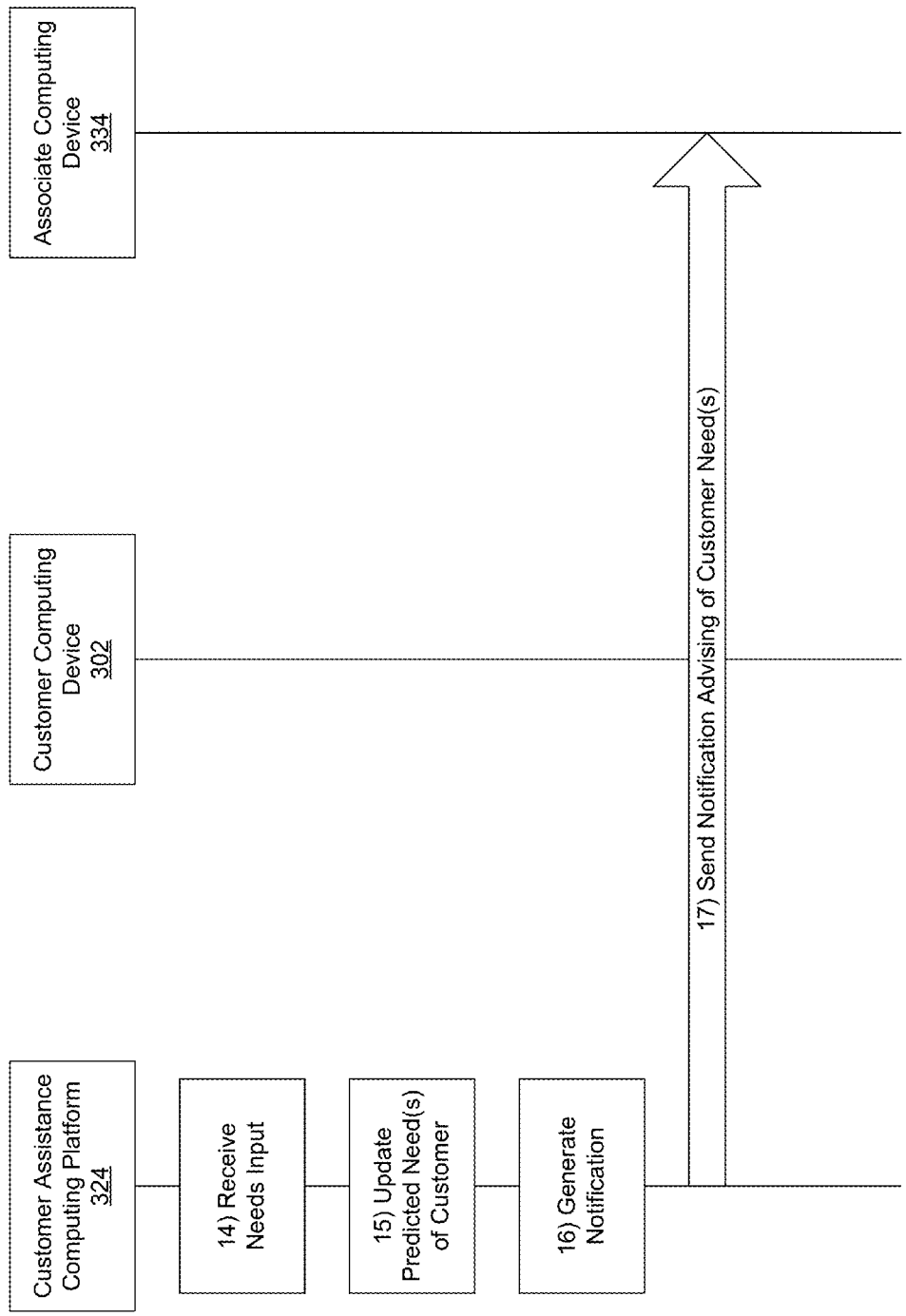

Referring to FIG. 4C, at step 12, customer computing device 302 may receive needs input from a user of customer computing device 302. Such needs input may, for instance, be provided in response to one or more of the example user interfaces discussed above and/or otherwise in response to the notification presented at step 11. In some instance, the needs input may, for example, identify one or more actual needs of the customer and/or the customer's reasons for visiting the banking center (e.g., banking center 304). For instance, such needs input may be provided by the user of customer computing device 302 in response to the prompt included in graphical user interface 500, as seen in FIG. 5. Referring again to FIG. 4C, at step 13, customer computing device 302 may send needs input information (which may, e.g., include the needs input received from the user of customer computing device 302) to customer assistance computing platform 324.

At step 14, customer assistance computing platform 324 may receive the needs input information from customer computing device 302. For example, at step 14, customer assistance computing platform 324 may receive, via communication interface 328, from customer computing device 302, needs input information. At step 15, customer assistance computing platform 324 may update the one or more predicted needs of the customer using customer computing device. For example, at step 15, customer assistance computing platform 324 may update the one or more predicted needs of the customer using customer computing device 302 based on the needs input information. In updating the one or more predicted needs of the customer based on the needs input information, customer assistance computing platform 324 may add one or more needs to the customer's predicted needs, remove one or more needs from the customer's predicted needs, and/or confirm one or more needs included in the customer's predicted needs, for example, based on information indicating that the user of customer computing device 302 added, removed, and/or confirmed one or more of the previously-determined predicted needs.

At step 16, customer assistance computing platform 324 may generate a notification based on the customer's predicted needs. For example, at step 16, customer assistance computing platform 324 may generate a notification configured to advise at least one banking center associate of the one or more predicted needs of the customer using customer computing device 302. At step 17, customer assistance computing platform 324 may send the generated notification to one or more associate computing devices. For example, at step 17, customer assistance computing platform 324 may send, via communication interface 328, to associate computing device 334, the notification. In some instances, the notification may be sent to the associate at the banking center that is physically located closest to the customer. For example, customer assistance computing platform 324 may send the notification to associate computing device 334 based on associate computing device 334 being used by and/or otherwise linked to a banking center associate at banking center 304 who is physically located closest to and/or within a predetermined distance of the customer using customer computing device 302.

Figure 8:
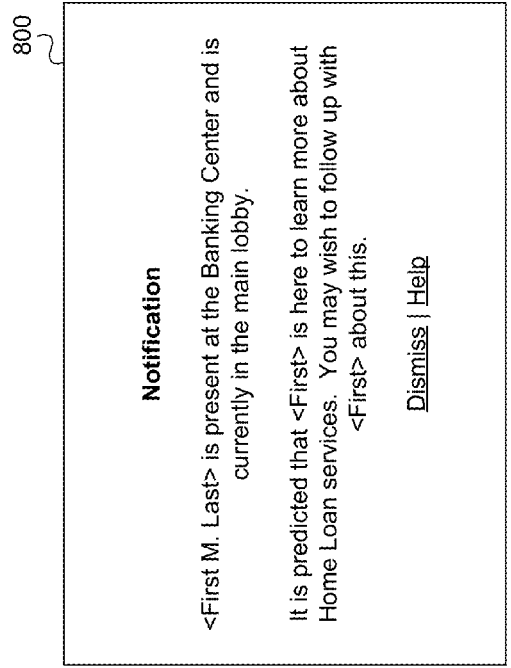

At step 18, associate computing device 334 may receive the notification from customer assistance computing platform 324, and at step 19, associate computing device 334 may present the notification received from customer assistance computing platform 324. Such a notification may, for example, enable one or more banking center associates (who may, e.g., be using banking center associate computing device 334 at the banking center at which the customer using customer computing device 302 is located) to be aware of the customer's presence and the one or more predicted needs of the customer, personally greet the customer, follow up with the customer about his or her predicted needs, respond to any questions the customer may have, and/or otherwise engage with the customer in a personalized and/or relevant way. In presenting such a notification, associate computing device 334 may, for example, display, cause to be displayed, and/or otherwise present a graphical user interface similar to graphical user interface 800, as seen in FIG. 8. For instance, graphical user interface 800 may include information indicating that the customer using customer computing device 302 is present at banking center 304 and may have specific needs, such as an interest in one or more specific products and/or services, which may enable a banking center associate using associate computing device 334 to follow up with the customer about his or her needs and/or otherwise engage with the customer using customer computing device 302 in a contextually relevant way.

In some embodiments, one or more events different from those discussed above may be performed if, for instance, the customer computing device 302 that is detected and/or otherwise recognized at banking center 304 by customer assistance computing platform 324 is determined to belong to a person who is not a current customer of the financial institution operating banking center 304. For example, in these instances, customer assistance computing platform 324 may generate and/or send a prompt to customer computing device 302 asking the user of customer computing device 302 to download and/or install a certain application, view certain content (e.g., advertising content about opening an account and/or other information about services that may be available at banking center 304), and/or perform other actions. Additionally or alternatively, one or more events of those discussed above may be repeated for a second customer who may be using a second customer computing device similar to customer computing device 302.

Figure 9:
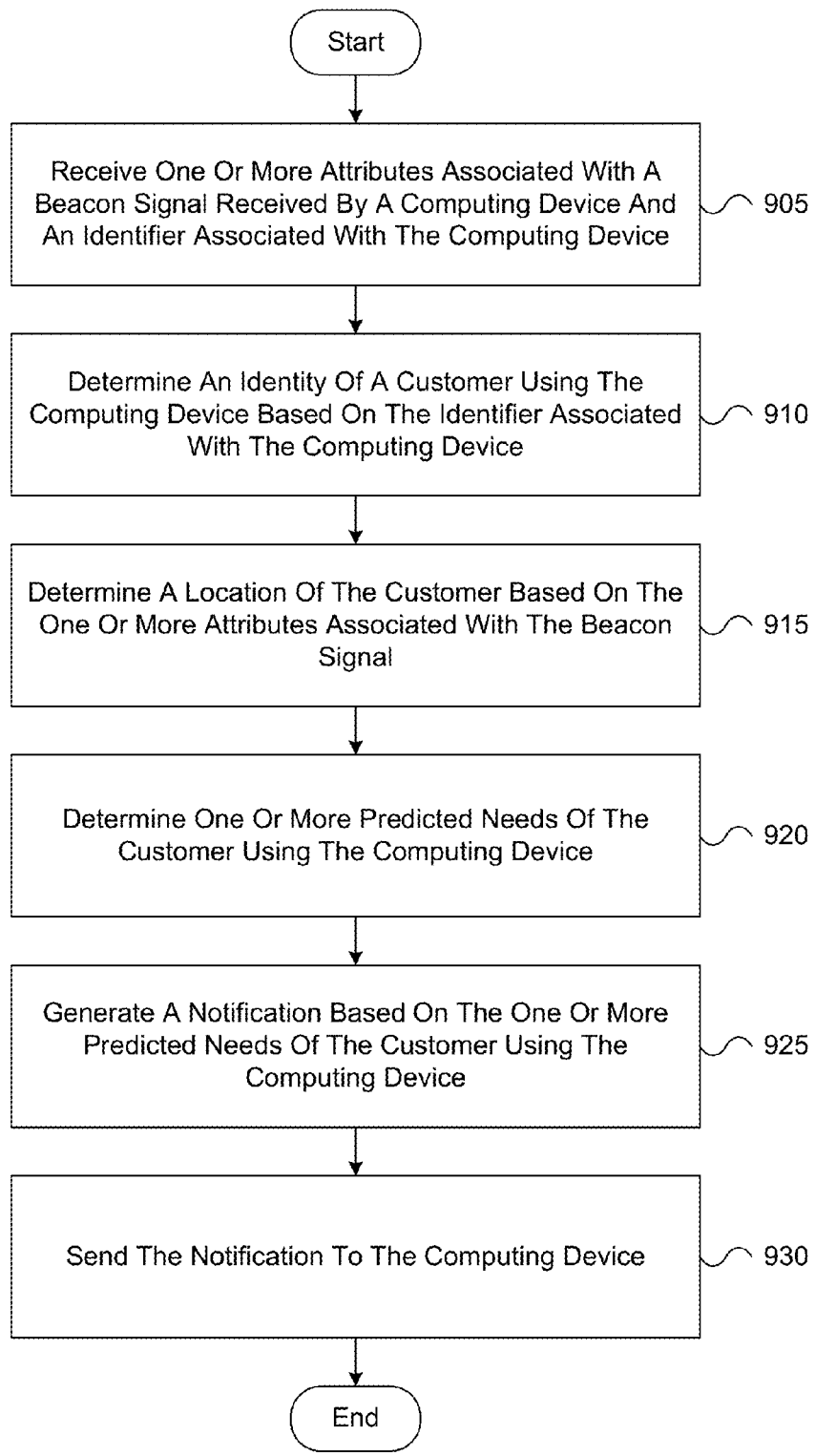
FIG. 9 depicts an illustrative method for predicting and responding to customer needs using local positioning technology in accordance with one or more example embodiments.

FIG. 9 depicts an illustrative method for predicting and responding to customer needs using local positioning technology in accordance with one or more example embodiments. As seen in FIG. 9, at step 905, a computing platform may receive one or more attributes associated with a beacon signal received by a computing device and an identifier associated with the computing device. At step 910, the computing platform may determine an identity of a customer using the computing device based on the identifier associated with the computing device. At step 915, the computing platform may determine a location of the customer based on the one or more attributes associated with the beacon signal. At step 920, the computing platform may determine one or more predicted needs of the customer using the computing device. At step 925, the computing platform may generate a notification based on the one or more predicted needs of the customer using the computing device. At step 930, the computing platform may send the notification to the computing device.

As illustrated above, systems and methods for providing enhanced retail customer experiences using indoor positioning technology are presented. In one or more example embodiments, a user may be identified based on a detection of a personal device of the user at a particular location, such as a banking center. After the user is identified, one or more needs may be predicted for the user based on the user's identity and/or other information associated with the user. After the one or more needs are predicted for the user, a notification may be presented on the user's mobile device. In some instances, content included in the notification may be generated based on the one or more predicted needs of the user.

In some instances, the user's personal device may be detected using indoor positioning system technology. In addition, the one or more predicted needs of the user may identify at least one predicted reason for the user's visit to the banking center. In some instances, the one or more needs of the user may be predicted based on transaction history information. For example, transaction history information may indicate that one of the user's accounts has a negative balance, and it may be predicted that the user is visiting the banking center to resolve this situation. As another example, transaction history information may indicate that one of the user's certificate of deposit accounts will mature soon, and it may be predicted that the user is visiting the banking center to meet with an associate to discuss this account. In some instances, the one or more needs of the user may be predicted based on online account activity information. For example, online account activity information may indicate that the user has started a loan application, and it may be predicted that the user is visiting the banking center to meet with an associate to discuss the loan application. In some instances, the content included in the notification may indicate that the user has visited an incorrect banking center or an incorrect area within the banking center based on the one or more predicted needs of the user and based on the detected location of the user's personal device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    at a customer assistance computing platform comprising at least one processor, memory, and a communication interface:
        receiving, by the at least one processor, via the communication interface, from a customer computing device, one or more attributes associated with a beacon signal received by the customer computing device and an identifier associated with the customer computing device, wherein the beacon signal received by the customer computing device is associated with at least one beacon deployed at a banking center, wherein the one or more attributes associated with the beacon signal received by the customer computing device include a unique identifier associated with the at least one beacon deployed at the banking center;
        determining, by the at least one processor, an identity of a customer using the customer computing device based on the identifier associated with the customer computing device, wherein the identifier associated with the customer computing device includes user account information associated with a mobile banking application on the customer computing device;
        determining, by the at least one processor, a location of the customer using the customer computing device based on the one or more attributes associated with the beacon signal received by the customer computing device;
        determining, by the at least one processor, one or more predicted needs of the customer using the customer computing device based on the identity of the customer using the customer computing device and based on the location of the customer using the customer computing device;
        generating, by the at least one processor, based on the one or more predicted needs of the customer using the customer computing device, a notification; and
        sending, by the at least one processor, via the communication interface, to the customer computing device, the notification.

2. The method of claim 1, further comprising:
    receiving, by the at least one processor, via the communication interface, from the customer computing device, biometric input information captured by the mobile banking application on the customer computing device.

3. The method of claim 2, wherein determining the identity of the customer using the customer computing device includes confirming the identity of the customer using the customer computing device based on the biometric input information captured by the mobile banking application on the customer computing device.

4. The method of claim 1, wherein determining the location of the customer using the customer computing device includes accessing beacon deployment information that maps identifiers for a plurality of beacons to corresponding deployment locations of the plurality of beacons.

5. The method of claim 4, wherein determining the location of the customer using the customer computing device includes determining that the customer using the customer computing device is located in a specific area of the banking center.

6. The method of claim 1, wherein the one or more predicted needs of the customer using the customer computing device are determined based on online account activity information.

7. The method of claim 1, wherein the one or more predicted needs of the customer using the customer computing device are determined based on transaction history information.

8. The method of claim 1, wherein the one or more predicted needs of the customer using the customer computing device are determined based on customer demographic information.

9. The method of claim 1, wherein the notification is configured to prompt the customer using the customer computing device to identify one or more actual needs.

10. The method of claim 1, wherein the notification is configured to instruct the customer using the customer computing device to proceed to a specific area at the banking center.

11. The method of claim 1, wherein the notification is configured to prompt the customer using the customer computing device to make an appointment at a location different from the banking center.

12. The method of claim 1, further comprising:
    receiving, by the at least one processor, via the communication interface, from the customer computing device, needs input information; and
    updating, by the at least one processor, the one or more predicted needs of the customer using the customer computing device based on the needs input information.

13. The method of claim 12, wherein updating the one or more predicted needs of the customer comprises (i) adding one or more needs to the one or more predicted needs, (ii) removing one or more needs from the one or more predicted needs, or (iii) confirming one or more needs included in the one or more predicted needs.

14. The method of claim 1, further comprising:
    generating, by the at least one processor, a notification configured to advise at least one banking center associate of the one or more predicted needs of the customer using the customer computing device; and
    sending, by the at least one processor, via the communication interface, to an associate computing device, the notification.

15. A system, comprising:
    at least one processor;
    a communication interface communicatively coupled to the at least one processor; and
    memory storing computer-readable instructions that, when executed by the at least one processor, cause the system to:
        receive, via the communication interface, from a customer computing device, one or more attributes associated with a beacon signal received by the customer computing device and an identifier associated with the customer computing device, wherein the beacon signal received by the customer computing device is associated with at least one beacon deployed at a banking center, wherein the one or more attributes associated with the beacon signal received by the customer computing device include a unique identifier associated with the at least one beacon deployed at the banking center;

determine an identity of a customer using the customer computing device based on the identifier associated with the customer computing device, wherein the identifier associated with the customer computing device includes user account information associated with a mobile banking application on the customer computing device;

determine a location of the customer using the customer computing device based on the one or more attributes associated with the beacon signal received by the customer computing device;

determine one or more predicted needs of the customer using the customer computing device based on the identity of the customer using the customer computing device and based on the location of the customer using the customer computing device;

generate, based on the one or more predicted needs of the customer using the customer computing device, a notification; and send, via the communication interface, to the customer computing device, the notification.

16. The system of claim 15, wherein the computer-readable instructions cause the system to:
receive, via the communication interface, from the customer computing device, needs input information; and
update the one or more predicted needs of the customer using the customer computing device based on the needs input information.

17. The system of claim 16, wherein updating the one or more predicted needs of the customer comprises (i) adding one or more needs to the one or more predicted needs, (ii) removing one or more needs from the one or more predicted needs, or (iii) confirming one or more needs included in the one or more predicted needs.

18. One or more non-transitory computer-readable media storing instructions that, when executed by a computing device comprising at least one processor, memory, and a communication interface, cause the computing device to:
receive, via the communication interface, from a customer computing device, one or more attributes associated with a beacon signal received by the customer computing device and an identifier associated with the customer computing device, wherein the beacon signal received by the customer computing device is associated with at least one beacon deployed at a banking center, wherein the one or more attributes associated with the beacon signal received by the customer computing device include a unique identifier associated with the at least one beacon deployed at the banking center;

determine an identity of a customer using the customer computing device based on the identifier associated with the customer computing device, wherein the identifier associated with the customer computing device includes user account information associated with a mobile banking application on the customer computing device;

determine a location of the customer using the customer computing device based on the one or more attributes associated with the beacon signal received by the customer computing device;

determine one or more predicted needs of the customer using the customer computing device based on the identity of the customer using the customer computing device and based on the location of the customer using the customer computing device;

generate, based on the one or more predicted needs of the customer using the customer computing device, a notification; and send, via the communication interface, to the customer computing device, the notification.

19. The one or more non-transitory computer-readable media of claim 18, wherein the instructions cause the computing device to:
receive, via the communication interface, from the customer computing device, needs input information; and
update the one or more predicted needs of the customer using the customer computing device based on the needs input information.

20. The one or more non-transitory computer-readable media of claim 19, wherein updating the one or more predicted needs of the customer comprises (i) adding one or more needs to the one or more predicted needs, (ii) removing one or more needs from the one or more predicted needs, or (iii) confirming one or more needs included in the one or more predicted needs.

* * * * *